March 15, 1938.  A. O. PAYNE  2,110,941
TUBE FOR TRANSFERRING FLUIDS AND VALVE MECHANISM THEREFOR
Filed March 7, 1935
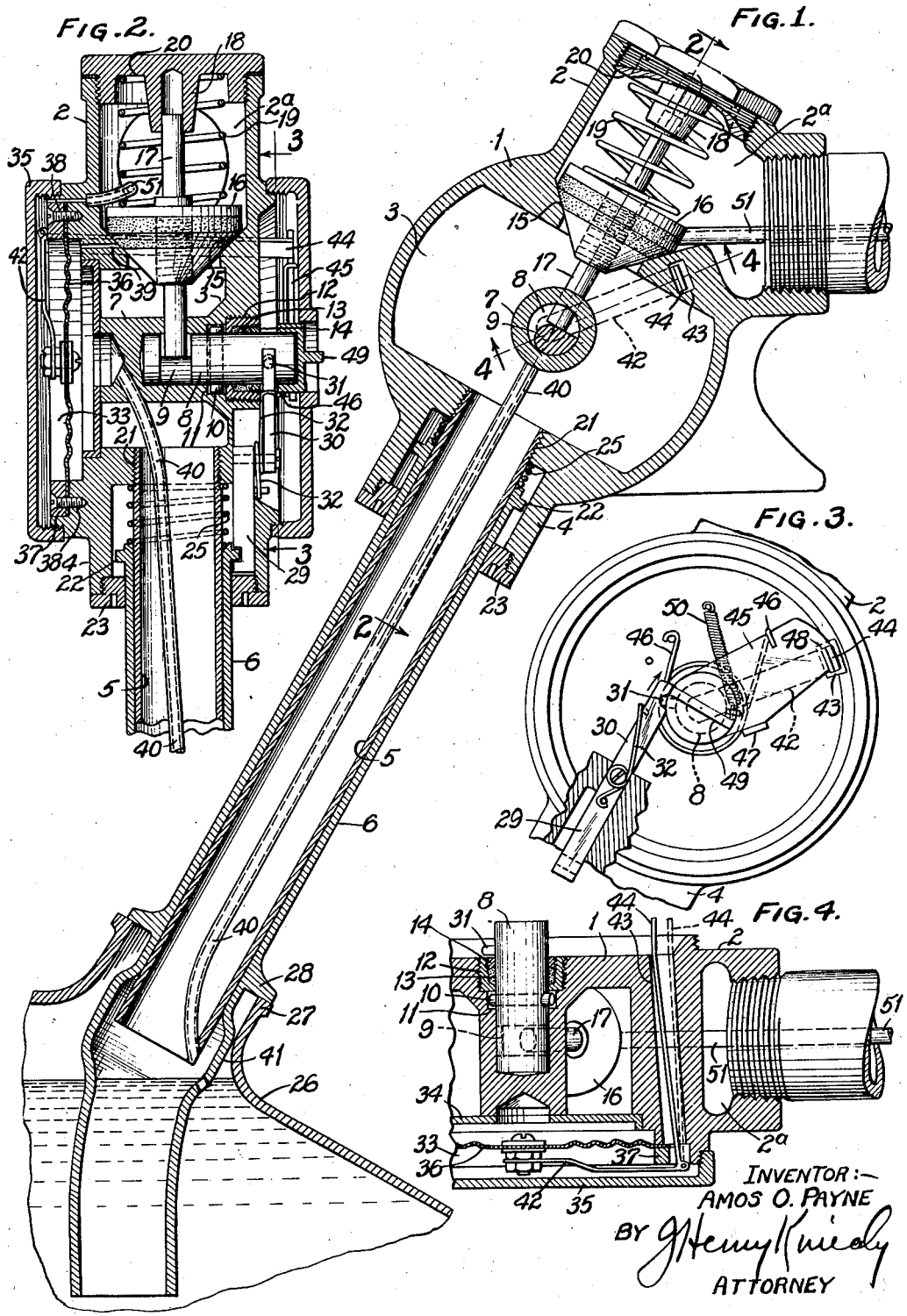
INVENTOR:—
AMOS O. PAYNE
BY *J Henry Kniely*
ATTORNEY Patented Mar. 15, 1938

2,110,941

UNITED STATES PATENT OFFICE 2,110,941

TUBE FOR TRANSFERRING FLUIDS AND VALVE MECHANISM THEREFOR

Amos O. Payne, East St. Louis, Ill.

Application March 7, 1935, Serial No. 9,722

6 Claims. (Cl. 226—127)

My invention relates to tubes for transferring fluids and to valve mechanism therefor and more particularly to such devices for transferring fluids from a source of supply to a place of discharge such as a tank, tube, or other receptacle to be filled to a predetermined level or to be filled with a predetermined amount of fluid.

The general type of device to be described herein is similar in many respects to those described and claimed in patents previously issued to me and in applications which are now pending in my name in the Patent Office. However, the device of the instant application is one which is simple and, therefore, may be manufactured easily and cheaply and, in addition, the present device differs in other respects, as set forth below, from the various embodiments of my basic invention.

In a device embodying my present invention the trigger mechanism for cocking the valve into open position has been dispensed with and the structure is greatly simplified. The valve is moved into open position by a part engaging the marginal surfaces of the receptacle adjacent the opening through which it is filled. Also, in embodiments of my device, as heretofore used by me, the passage through which the fluid passed was constricted to form a Venturi opening so that the increased rate of flow of the fluid through such constricted opening would cause a suction which, when the port for an equalizing flow of air was closed, would cause the valve to close by movement of a diaphragm. In embodiments of this invention the valve opening has the seat thereof formed to provide a constricted opening through which the fluid passes and the velocity of the fluid passing through the valve opening and past the valve seat causes a suction similar in all respects to that heretofore caused by the Venturi tube.

Furthermore, often it is desirable that the valve be automatically shut off to prevent further flow of fluid when a predetermined amount of fluid has been transferred to the place of discharge and, therefore, my present invention provides means for so stopping the flow.

In the accompanying drawing I have shown my invention to acomplish the above and other objects as embodied in a filler spout nozzle formed as a part of a tube for dispensing liquid such as gasoline into the fuel tank of an automobile. However, it is to be understood that this embodiment may be used for other purposes and other embodiments of my invention in its broad aspect for further uses may be made to include the mechanism outlined herein and covered by the claims.

In the drawing, wherein similar characters are used to designate similar parts, Fig. 1 is a sectional view through the nozzle; Fig. 2 is a cross section along the line 2—2 in Fig. 1; Fig. 3 is a section along the line 3—3 in Fig. 2; and Fig. 4 is a partial section along the line 4—4 in Fig. 1.

Referring to the figures the nozzle shown therein as embodying one form of my invention comprises a casing 1 which, for cheapness of manufacture, is preferably cast in one piece so as to include an upper cylindrical extension 2 forming a valve chamber communicating with the hollow interior 3 of the casing proper and a lower extension 4 from which extends the outlet tube 5 and its axially movable sleeve 6, for the purposes outlined below. The casing may be made of any suitable material, but is preferably cast of aluminum or other durable and light metal.

Arranged, preferably, centrally of the casing in the hollow interior 3 is a block 7 which is drilled to receive a freely rotatable shaft 8. The shaft near the inner end thereof is cut or otherwise formed with a reduced cam surface 9. The shaft 8 is maintained in position and prevented from longitudinal movement by a pin 10 projecting beyond the circumference thereof at diametrically opposite points positioned between the shoulder 11 formed on the block 7 and a nut 12 threaded into the body of the casing 1. The nut 12 preferably has a recessed portion to receive a packing material such as graphite as indicated at 13 and a packing nut 14 threaded into the inner surface of the nut 12 whereby the packing material may be confined and whereby fluid passing through the nozzle will not find its way into the bore of the block 7. In manufacturing the device the shaft 8 and its packing may be assembled and the unit may be inserted into place by turning the nut 12 into the threaded portion of the casing body.

Opening between the valve chamber 2ª in the extension 2 of the casing and the hollow interior 3 thereof is a valve opening 15 which has the sides thereof inclined inwardly in the direction of flow therethrough or which is otherwise formed to provide a constricted opening through which passes fluid being dispensed by the nozzle. Preferably the valve opening is formed so that the constricted part presents a seat for a valve 16 of the usual type. The valve 16 is carried by a guide rod 17, one end of which is slidably mounted in a boss 18 and the other end of which extends into contact with the cam 9 formed on the shaft 8. The valve is maintained in closed position by a spring 19 positioned between the rear face of the valve and a removable plate 20 threaded into the outer end of the extension 2. It readily will be seen by examination of Fig. 1 that when the shaft 8 is rotated in a clockwise direction the cam 9 will move the guide rod 17 to carry the valve away from its seat and into open position.

The means for so rotating the shaft 8 to open the valve is controlled by movement of the sliding sleeve 6 along the outlet tube 5 of the nozzle. The tube 5 is threaded in the body of the casing 1 as at 21 and the lower extension 4 of the casing is bored out to provide an annular opening around the tube. The inner end of the sleeve 6 is provided with a shoulder 22 and the sleeve is prevented from moving too far outwardly along the tube 5 by a nut 23 threaded in the extension. A spring 25 normally holds the sleeve outwardly along the tube, but when the tube is inserted in a tank 26 or other receptacle to be filled the marginal surfaces of the tank inlet 27 engage an annular flange 28 formed on the sleeve and move the sleeve upwardly along the tube or, that is, move the sleeve in a direction towards the casing.

The link 29 has a notch therein to receive the shoulder 22 of the sleeve, as shown in Fig. 2, and as the sleeve is moved in the diretcion indicated the link 29 is moved upwardly and, in turn, the finger 30 pivotally attached to the link is likewise moved. The finger 30 has a notch therein adapted to engage the pin 31 extending outwardly from the shaft 8 and as the finger is moved upwardly the notch engages the pin and rotates the shaft 8 to move the valve 16 into open position. Preferably, a spring 32 is provided to hold the finger 30 in such engagement with the pin 31.

Therefore, when the nozzle is put into position to fill a tank or other receptacle the valve will be opened automatically and flow through the nozzle will start. However, as described above, it is desirable that the flow be stopped when the level of fluid at the place of discharge has reached a predetermined point or when a predetermined quantity of fluid has been dispensed and the mechanism for controlling the flow automatically upon those conditions is as follows:

Formed at one side of the casing 1 is a diaphragm chamber 33 positioned between the partition plate 24 and a cover plate 35. Mounted in the chamber is a diaphragm 36, preferably, of metal, which is maintained in position by a ring 37 fastened to the casing by stud screws 38 or by any other suitable expedient. In this embodiment I have shown the diaphragm in its simplest form, but it may be balanced between springs, as heretofore taught by me, or may be of any other form. Leading from the chamber 33 to the constricted valve opening 15 is a small port 39. Also, leading from the chamber on the same side of the diaphragm is an air tube 40 which terminates at its lower end in the enlarged portion 41 of the sleeve 6 and at the point where when the tube is inserted in a receptacle to be filled the desired level of fluid in said receptacle has been reached. Fastened, preferably at the center of the diaphragm 36 is one end of a bell crank 42 and the other leg of which extends through an opening 43 in the casing past the opposite side face thereof. When the diaphragm is moved inwardly, the end 44 of the bell crank opposite the end attached to the diaphragm will be moved outwardly in a direction away from the center of the casing and when the diaphragm is moved outwardly the end 44 will be moved in a reversed direction.

Positioned on the side of the casing adjacent the end 44 of the bell crank is a hammer 45 which is freely rotatable about the shaft 8 and which is, in this embodiment, normally impelled in a clockwise direction by a spring 46. The hammer 45 has an inwardly projecting lug 47 arranged to contact the finger 30 and carry it away from engagement with the pin 31. Likewise, the outer end of the hammer 45 is notched as at 48 to receive the end 44 of the bell crank whereby the hammer will be held away from the finger 30 and contact will be prevented between the hammer and the finger.

Having thus completely described the parts of my device its operation as now to be set forth will be understood. When it is desired to fill the tank 26 with this embodiment of my invention the diaphragm will be in normal position and the end 44 of the bell crank will, therefore, be in position nearest the center of the casing. The hammer 45 is moved in a counter-clockwise direction by manually turning the grip 49 until the notch 48 engages the end 44 of the bell crank whereby the hammer will be maintained in cocked position. The lower ends of the tube 5 and the sleeve 6 are then inserted into the tank end, as described above. When the flange 28 engages the marginal surfaces 27 the sleeve 6 will be moved to move the link 29 and finger 30 to rotate the shaft 8 and, thereby, to move the valve 16 into open position. Flow of fluid through the nozzle will then commence and such flow through the constricted valve opening 15 will cause a suction through the port 39 in that portion of the diaphragm chamber 33 on one side of the diaphragm 36. However, such suction will be equalized by air entering the chamber through the duct 40. However, when the level of fluid in the tank 26 has reached a point where it will cover the lower end of the duct 40 in the enlarged part 41 the equalizing flow of air will be stopped and further suction through the port 39 will move the diaphragm 36 and, in turn, will move the bell crank outwardly away from engagement with the hammer 45. The hammer will then be impelled by its spring to move in a clockwise direction and the lug 47 striking against the finger 30 will carry the finger out of engagement with the pin 31 and a spring 50 will move the shaft 8 in a counter clockwise direction whereby the cam 9 will be moved to allow the valve 16 to be closed by the spring 19. In this manner, flow through the nozzle will be stopped.

Of course, it will be understood that if through accident the nozzle falls away from the receptacle being filled the sleeve 6 will be moved downwardly by the spring and in turn, the link 29 and its carried finger 30 will be moved downwardly out of engagement with the pin 31 and the shaft 8 will be rotated by its associated spring to allow the valve to close.

Flow may be stopped similarly when a given amount of fluid has been dispensed into the tank and to accomplish this result a dispensing pump, not shown, is arranged so that when a predetermined amount of fluid has been metered therethrough a valve will be opened to allow air to flow from any suitable source through the tube 51 into the diaphragm chamber 33 on the outside of the diaphragm 36 and such compressed air will move the diaphragm to accomplish the same result as accomplished by suction through the port 39.

From the above description it readily will be seen that I have provided by my present invention a simple and efficient transfer tube and valve mechanism therefor. However, it should be borne in mind, as stated above, that devices embodying various forms of my invention may be made in various ways wherein the shape and arrangement of the parts may be changed within wide limits without deviating from the spirit of the claims as set forth below.

What I claim as new and desire to secure by Letters Patent, is:—

1. The combination with a tube for use in transferring fluids from one place to another, of a valve mechanism for controlling the flow of fluid, a diaphragm and a chamber associated therewith, said valve mechanism including a valve and a valve opening constricted in the direction of flow therethrough, said constricted opening and said chamber being in communication with one another whereby air will be drawn from said chamber during the flow of fluid through said tube, said chamber also having an air inlet thereto, a duct leading from said air inlet to the place of discharge and arranged whereby when the fluid at said place of discharge has reached a predetermined level the lower end of said duct will be closed and the continued flow of air into said chamber will be prevented, and an operative connection between said diaphragm and said valve whereby when air is prevented from entering said chamber said diaphragm will be moved to close said valve.

2. The combination with a tube for use in transferring a fluid from one place to another, of a valve mechanism for controlling the flow of fluid, a diaphragm and a chamber associated therewith, said valve mechanism including a valve seated in a constricted opening, said constricted opening and said chamber being in communication with one another whereby air will be drawn from said chamber during the flow of fluid through said tube, said chamber also having an inlet duct leading thereto and through which duct air may enter said chamber, and said inlet duct being positioned and arranged whereby when a predetermined level is reached at the place of discharge of said fluid the continued flow of air through said inlet duct will be prevented, and an operative connection between said diaphragm and said valve whereby when air is prevented from passing into said chamber through said inlet duct said diaphragm will be moved to close said valve.

3. The combination with a tube for use in transferring fluid from one place to another, of a valve mechanism for controlling the flow of fluid, a diaphragm and a chamber associated therewith, said valve mechanism including a valve and a valve opening constricted in the direction of flow of fluid therethrough, said constricted opening and said chamber being in communication with one another whereby air will be drawn from said chamber during the flow of fluid through said tube, said chamber also having an inlet duct leading thereto and through which duct air can enter said chamber, and said inlet duct being positioned and arranged whereby when a predetermined level is reached at the place of discharge of said fluid continued flow of air through said inlet duct and into said chamber will be prevented, and an operative connection between said diaphragm and said valve whereby when air is prevented from passing into said chamber said diaphragm will be moved to close said valve.

4. The combination with a tube for use in transferring fluids from one place to another, of a valve casing having an outlet tube extending therefrom and containing a valve mechanism for controlling the flow of fluid through said tube, said valve mechanism including a valve, a rotatable shaft having a cam formed thereon and positioned and arranged whereby movement of said cam will move said valve into open position, a spring arranged to tend to move said shaft to allow said valve to close, a sleeve slidably mounted on and surrounding said outlet tube and adapted to engage the marginal surface of the receptacle into which said fluid is transferred whereby said sleeve will be moved by such engagement, a link extending between said sleeve and said shaft whereby said movement of said sleeve will rotate said shaft to move said valve into open position, and means operating at a predetermined level of fluid in said receptacle for moving said link out of engagement with said shaft whereby said shaft will be rotated by said spring to allow said valve to close.

5. The combination with a tube for use in transferring fluid from one place to another, of a valve casing having an outlet tube extending therefrom and containing a valve mechanism for controlling the flow of fluid through said tube, said valve mechanism including a valve, a valve stem extending from said valve, a rotatable shaft having a cam thereon engaging said valve stem and arranged whereby movement of said cam will move said stem to move said valve into open position, a sleeve slidably mounted on and surrounding said outlet tube and adapted to engage the marginal surface of the receptacle into which said fluid is transferred whereby said sleeve will be moved by such engagement, and an operative connection between said sleeve and said shaft whereby said movement of said sleeve will rotate said shaft to open said valve.

6. The combination with a tube for use in transferring fluids from one place to another, of a valve casing having an outlet tube extending therefrom and containing a valve mechanism for controlling the flow of fluid through said tube, said valve mechanism including a valve, a valve stem extending from said valve, a rotatable shaft having a cam thereon engaging said valve stem and arranged whereby movement of said cam will move said stem to move said valve into open position, a spring arranged to tend to move said shaft to allow said valve to close, a sleeve slidably mounted on and surrounding said outlet tube and adapted to engage the marginal surface of the receptacle into which said fluid is transferred whereby said sleeve will be moved by such engagement, a link extending between said sleeve and said shaft whereby said movement of said sleeve will rotate said shaft to move said valve into open position, and means operating at a predetermined level of fluid in said receptacle for moving said link out of engagement with said shaft whereby said shaft will be rotated by said spring to allow said valve to close.

AMOS O. PAYNE.